(12) United States Patent
Lee

(10) Patent No.: US 8,391,864 B2
(45) Date of Patent: Mar. 5, 2013

(54) METHOD AND APPARATUS FOR LOCATION REGISTRATION UPDATE ON FAILURE TO INSERT SUBSCRIBER DATA IN MOBILE COMMUNICATION SYSTEM

(75) Inventor: Ji-Won Lee, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/381,814

(22) PCT Filed: Jul. 7, 2010

(86) PCT No.: PCT/KR2010/004424
§ 371 (c)(1),
(2), (4) Date: Dec. 30, 2011

(87) PCT Pub. No.: WO2011/005031
PCT Pub. Date: Jan. 13, 2011

(65) Prior Publication Data
US 2012/0115511 A1    May 10, 2012

(30) Foreign Application Priority Data
Jul. 10, 2009   (KR) .................. 10-2009-0063010

(51) Int. Cl.
*H04Q 7/20* (2006.01)

(52) U.S. Cl. .................. 455/435.1; 455/433; 455/432.1; 370/328

(58) Field of Classification Search .............. 455/435.1, 455/433, 432.1; 370/328
See application file for complete search history.

(56) References Cited

U.S. PATENT DOCUMENTS

| | | | |
|---|---|---|---|
| 6,266,526 B1 | 7/2001 | Kim | |
| 6,311,063 B1* | 10/2001 | Valliani et al. | 455/433 |
| 6,738,629 B1* | 5/2004 | McCormick et al. | 455/456.1 |
| 6,956,939 B1* | 10/2005 | Boland et al. | 379/220.01 |
| 7,013,139 B1* | 3/2006 | Gan et al. | 455/432.3 |
| 7,873,358 B2* | 1/2011 | Jiang | 455/435.1 |
| 2004/0259531 A1* | 12/2004 | Wood et al. | 455/412.1 |
| 2005/0143075 A1* | 6/2005 | Halsell | 455/445 |
| 2005/0261005 A1* | 11/2005 | Hu | 455/456.5 |
| 2007/0195752 A1* | 8/2007 | Gayde et al. | 370/352 |

FOREIGN PATENT DOCUMENTS

| | | |
|---|---|---|
| KR | 1020000005663 A | 1/2000 |
| KR | 1020070020925 A | 2/2007 |
| KR | 1020080073828 A | 8/2008 |
| KR | 1020090001118 A | 1/2009 |

OTHER PUBLICATIONS

PCT International Search Report, Korean Intellectual Property Office, Feb. 23, 2011.

* cited by examiner

*Primary Examiner* — Danh Le
(74) *Attorney, Agent, or Firm* — IP Legal Services, LLC

(57) ABSTRACT

A method for location registration update on failure to insert subscriber data caused by a location registration error in a mobile communication system, comprising (a) in the case of a change in subscriber data, a home location register transmitting the subscriber data to a first switching center in which location of a corresponding subscriber is registered, to request the first switching center to insert the subscriber data; (b) in the case of the first switching center's failure to insert the subscriber data, the home location register being notified of the failure; and (c) the home location register extracting a switching center group, to which the first switching center belongs, from a switching center group database for storing switching center data that is grouped according to geographical closeness, and transmitting a location registration update request signal to switching centers in the extracted group.

14 Claims, 5 Drawing Sheets

METHOD AND APPARATUS FOR LOCATION REGISTRATION UPDATE ON FAILURE TO INSERT SUBSCRIBER DATA IN MOBILE COMMUNICATION SYSTEM

CROSS REFERENCE TO PRIOR APPLICATIONS

The present application is a National Stage Application of PCT International Application No. PCT/KR2010/004424 (filed on Jul. 7, 2010), under 35 U.S.C. 371, which claims priority to Korean Patent Application No. 10-2009-0063010 (filed on Jul. 10, 2009), which is hereby incorporated by reference in its entirety.

TECHNICAL FIELD

The present invention relates to location registration processing between a switching center and a mobile communication terminal in a mobile communication system, and more particularly, to method and apparatus for preventing failure to insert subscriber data from occurring due to double location registration, abnormal location registration, etc.

CROSS-REFERENCE TO RELATED APPLICATION

This application claims priority to Korean Patent Applicattion No. 10-2009-0063010filed in Republic of Korea on Jul. 10, 2009, the entire contents of which are incorporated herein by reference

BACKGROUND ART

Recently, with remarkable development of electronics and communication engineering, mobile communication terminals have various functions and mobile communication systems provide various services. That is, with rapid development of radio communication and data processing techniques, people can be offered with voice communication service, and furthermore, internet access, video communication, moving image message transmit services, etc. using mobile communication terminals. As mobile communication terminals spread rapidly, a considerable amount of human communication is made through the mobile communication terminals, and the mobile communication terminals became an indispensable communication means in modern society.

Mobile communication systems offering such mobile communication services include a mobile switching center (MSC), a home location register (HLR), a base station controller or radio network controller (BSC, RNC), a base transceiver station (BTS, Node B) and a mobile station (MS). The mobile switching center is an essential network element in a mobile communication network, and controls voice communication and various supplementary services, sets communication channels, and provides connection to various equipments and external network, etc. That is, the mobile switching center provides mobile communication subscribers a circuit switching service and a communication channel switching function.

Here, the home location register is linked with the switching center, and serves to manage and support mobility of mobile communication terminals. The home location register always knows the current location of mobile communication terminals through location registration. The mobile switching center provides location data of the mobile communication terminals to the home location register, and if necessary, may receive location data of the terminals from the home location register. For this purpose, the mobile switching center has a visitor location register, and stores temporarily and utilizes location data and subscriber data of mobile communication terminals under its control.

Thus, when there is a change in subscriber data, a subscriber data management server transmits the changed data to the home location register so that the change can be reflected on subscriber data stored in the home location register. Then, when there is a change in the subscriber data stored in the home location register, the home location register transmits the changed data to a mobile switching center where a corresponding subscriber's mobile communication terminal is under control so that the changed subscriber data can be reflected on a visitor location register provided in the switching center.

However, as the mobile communication systems become more complicated and the number of mobile communication subscribers increases year after year, an error in location registration often occurs, such as abnormal location registration, double location registration, etc. If such error is not corrected, it may have difficulty in normally transmitting the changed subscriber data to a switching center so that the changed subscriber data is reflected on the switching center.

Conventionally, to correct the error in location registration (failure to insert subscriber data) such as double location registration, abnormal location registration, etc., a message requesting a new location registration was transmitted to all switching centers recorded in or linked with a home location register.

However, this conventional solution enables all switching centers to perform a location registration whenever an error in location registration occurs. This leads to simultaneous location registration of a huge number of mobile switching centers, resulting in system overload.

In particular, the system overload intensively occurs to the home location register, and as a result, the home location register is beyond normal operation, for example, MAP failure. If so, a fatal problem may be raised that desired services cannot be provided to mobile communication subscribers well.

DISCLOSURE OF INVENTION

Technical Problem

Therefore, the present invention is designed to solve the problem, and it is an object of the present invention to provide apparatus and method in which a home location register performs a location registration correction while minimizing the system load, on failure to insert subscriber data (ISD) in a mobile communication system that may occur after subscriber data change.

These and other objects and advantages will be apparent from the embodiments of the present invention. And, the objects and advantages of the invention may be realized by means of instrumentalities and combinations particularly pointed out in the appended claims.

Solution to Problem

To achieve the objects, a method for location registration update on failure to insert subscriber data caused by double location registration or abnormal location registration in a mobile communication system, comprises (a) in the case of a change in subscriber data, a home location register of the mobile communication system transmitting the subscriber data to a first switching center in which location of a corresponding subscriber is registered, to request the first switching center to insert the subscriber data; (b) in the case of the first switching center's failure to insert the subscriber data, the home location register being notified of the failure; and (c) the home location register extracting a switching center group, to which the first switching center belongs, from a switching center group database (DB) for storing switching center data that is grouped according to geographical closeness, and transmitting a location registration update request signal to switching centers included in the extracted group.

In another aspect of the present invention, an apparatus for location registration update on failure to insert subscriber data caused by double location registration or abnormal location registration in a mobile communication system, comprises a database configured to store switching center group data, subscriber data and subscriber location registration data, the switching center group data including switching center data grouped according to geographical closeness; a subscriber data insert means configured, in the case of subscriber data change in the database, to transmit the changed subscriber data to a switching center in which location of a corresponding subscriber is registered, to request the switching center to insert the subscriber data, and to check if the switching center inserted the subscriber data; and a location registration update means configured, in case it is determined that the switching center failed to insert the subscriber data, to extract a switching center group, to which the switching center belongs, from the switching center group data in the database, to transmit a location registration update request signal to switching centers included in the extracted group, and to update the subscriber location registration data in the database after the switching centers' updating of the subscriber location registration data.

According to still another aspect of the present invention, a computer readable medium having a program for location registration update on failure to insert subscriber data caused by double location registration or abnormal location registration in a mobile communication system, comprises: a process for, in the case of subscriber data change in a subscriber data management server, receiving a subscriber data update request from the subscriber data management server and updating the corresponding subscriber data being stored and managed in a database of a home location register; a process for transmitting the updated subscriber data to a first switching center in which location of a corresponding subscriber is registered, to request the first switching center to insert the subscriber data; a process for, in the case of the first switching center's failure to insert the subscriber data, being notified of the failure; a process for extracting a switching center group, to which the first switching center belongs, from a switching center group database (DB) of the home location register for storing switching center data grouped according to geographical closeness, and transmitting a location registration update request signal to switching centers included in the extracted group; a process for location registration updating by the switching centers having received the location registration update request signal, and updating subscriber location registration data in the home location register; and re-transmitting the changed subscriber data to a second switching center in which location of the subscriber is registered based on the updated subscriber location registration data, to request the second switching center to insert the subscriber data.

ADVANTAGEOUS EFFECTS OF INVENTION

According to the present invention, as a boundary zone between adjacent switching centers is liable to an error in location registration such as double location registration or abnormal location registration, switching centers recorded in a home location register are classified into switching center groups according to geographical closeness, and in the case of failure to insert subscriber data, only switching centers included in a corresponding group are made to perform a location registration update, so that it can minimize the system load occurring at the time of correcting the error.

And, there is no need for all switching centers to perform a location registration update to correct the error, but a need for switching centers included in a corresponding group to perform a location registration update, and consequently, it allows service processing of the other switching centers, thereby remarkably reducing the service response time in the entire mobile communication system.

DESCRIPTION OF DRAWINGS

The accompanying drawings illustrate the preferred embodiments of the present invention and are included to provide a further understanding of the spirit of the present invention together with the detailed description of the invention, and accordingly, the present invention should not be limitedly interpreted to the matters shown in the drawings.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
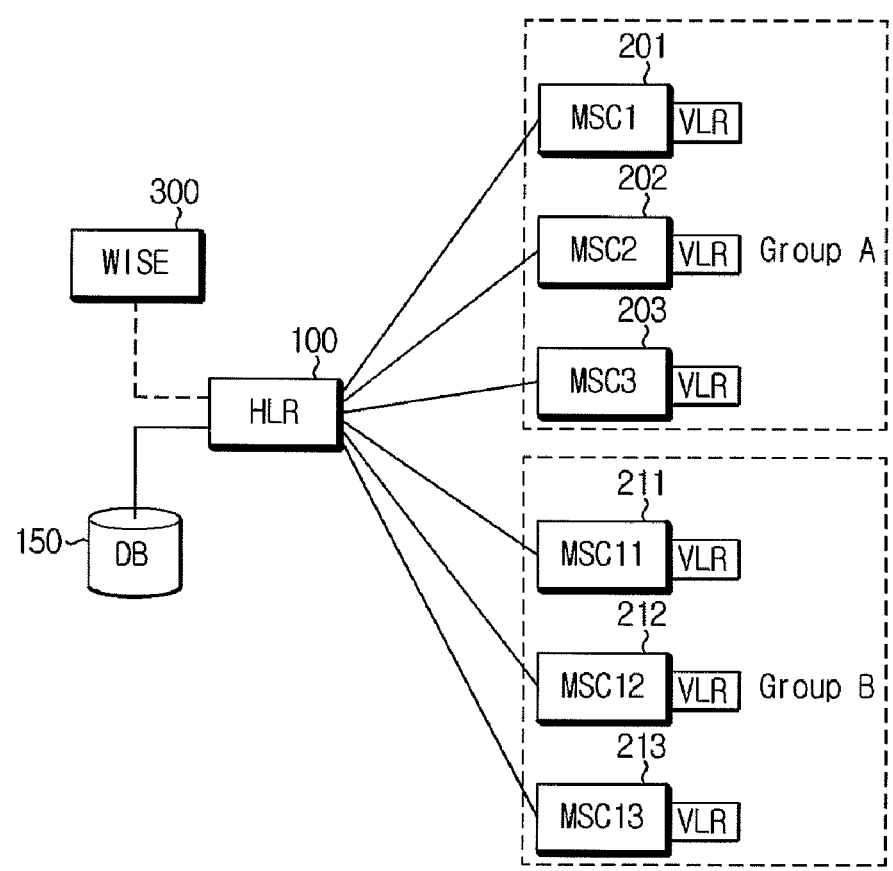
FIG. 1 is a view showing a portion of a mobile communication system incorporating a method for location registration update on failure to insert subscriber data in the mobile communication system according to an embodiment of the present invention.

FIG. 1 is a view showing a partial structure of a mobile communication system incorporating a method for location registration update on failure to insert subscriber data in the mobile communication system according to an embodiment of the present invention.

As shown in FIG. 1, the mobile communication system incorporating the present invention comprises a subscriber data management server 300, a home location register 100, a database 150 provided in the home location register 100, and a plurality of switching centers connected to the home location register 100.

The subscriber data management server 300 registers and manages subscriber data of mobile communication service subscribers. The subscriber data management server 300 is called as wireless information service environment (WISE). The subscriber data management server 300 registers and manages subscriber data, for example, by insertion, change, deletion and so on, at the request of subscribers or customers, and in the case of subscription to new supplementary service(s), it also registers and manages supplementary service data of subscribers. And, when there is a change in subscriber data being stored and managed, the subscriber data management server 300 transmits the changed data to the home location register 100 to be described below so that the changed data can be reflected on the home location register 100.

The home location register 100 stores and manages subscriber data of subscribers whose mobile communication terminal's location is registered therein, and stores and manages supplementary service data. Also, the home location register 100 registers location data of mobile communication terminals, and manages mobility data of the terminals. Accordingly, the home location register 100 receives a request for mobility data, supplementary service data or other subscriber data of a called terminal from a switching center, extracts the corresponding data from the database 150, and provides the extracted data to the switching center. Further, when a mobile communication terminal is moved, the home location register 100 registers the changed location data of the terminal according to a location registration process.

Besides, the home location register 100 performs a location registration update when failure to insert subscriber data occurs due to double location registration, abnormal location registration, etc. The detailed description is made below with reference to FIG. 2.

The switching center performs a mobile communication switching of mobile communication terminals. That is, the switching center performs incoming and outgoing call processing of wireless-connected mobile communication terminals. The switching center has a visitor location register for storing and managing subscriber data (including supplementary service data), etc. of mobile communication terminals under its control. Data stored in the visitor location register is received from the home location register 100, and if a mobile communication terminal is moved from a switching center to another switching center due to roaming or handoff, the corresponding subscriber data in the visitor location register may be deleted. That is, the switching center receives, from the home location register 100, subscriber data of mobile communication terminals only that entered its coverage at the time of location registration, and manages such subscriber data.

The database 150 provided in the home location register 100 stores subscriber data, supplementary service data, location data, switching center data of terminals, and so on. Here, location data and switching center data of terminals denote mobility data, and in particular, switching center data and base station data of a specific terminal are location data of the terminal. At this time, the database 150 sorts switching center data, according to location, into switching center group data having geographical closeness, and stores and manages them. For example, as shown in FIG. 1, the database 150 groups into adjacent switching centers having geographical closeness, and manages a switching center group A 201, 202 and 203, a switching center group B 211, 212 and 213, and so on. Thus, when searching data of a mobile communication terminal from the database 150, the home location register 100 can obtain data of a switching center where a corresponding terminal is under control, and data of a group to which the switching center belong. Furthermore, the home location register 100 can obtain data of all switching centers included in a specific group.

Figure 2:
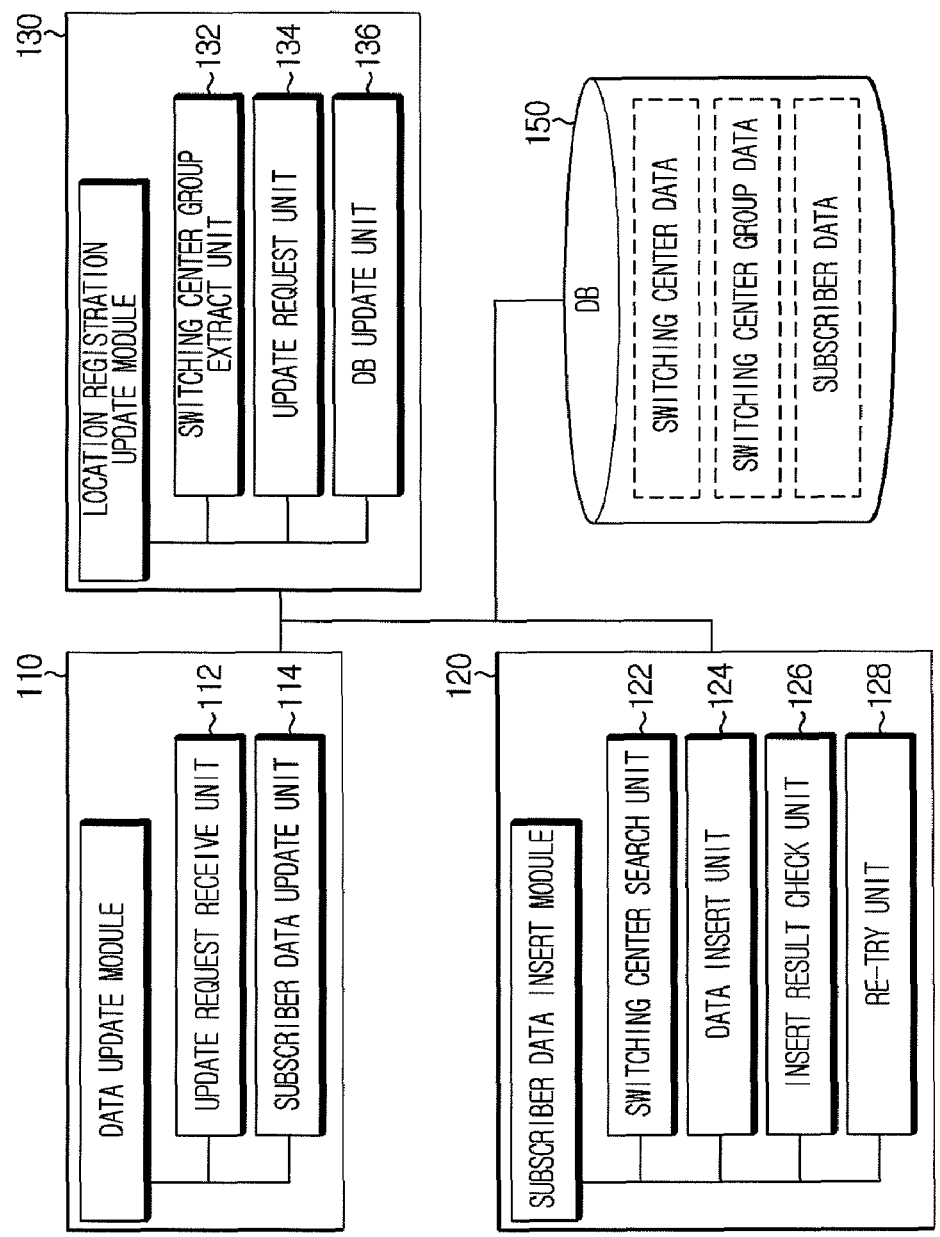
FIG. 2 is a view showing an apparatus for location registration update on failure to insert subscriber data in the mobile communication system according to an embodiment of the present invention.

FIG. 2 is a view showing an apparatus for location registration update on failure to insert subscriber data in the mobile communication system according to an embodiment of the present invention.

First, the apparatus 100 for location registration update according to the present invention has a configuration of a general home location register, and performs functions of a general home location register. Referring to FIG. 2, the apparatus 100 of the present invention comprises a data update module 110, a subscriber data insert module 120, a location registration update module 130, and a database 150.

The database 150 stores and manages switching center data that is related to mobility of a home location register, switching center group data that switching center data is classified according to geographical closeness, and subscriber data received from the subscriber data management server 300. Here, an example of switching center data and switching center group data stored in the database 150 is shown in FIG. 3.

Figure 3:
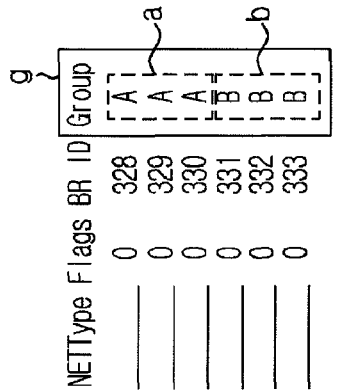
FIG. 3 is a view showing an example of data stored in a database of the apparatus according to an embodiment of the present invention.

FIG. 3 is a view showing an example of data stored in the database 150 of the apparatus 100 according to an embodiment of the present invention.

Referring to FIG. 3, switching center data is stored and managed each parameter. As shown in FIG. 3, a group parameter field (g) is additionally created. The group parameter is used to mark geographically adjacent switching centers by groups, and indicated as an indicator per group. For example, switching centers located in Yongin City are grouped into a group A, and an indicator A(a) is given to a corresponding group parameter field (g). And, switching centers located in Guro-Gu, Seoul, are grouped into a group B, and an indicator B(b) is given to a corresponding group parameter field (g). That is, switching centers located in Yongin City have all indicators A(a) in the group parameter field (g). Thus, it can easily grasp switching centers having geographical closeness through group data, and immediately extract data of the switching centers.

When there is a change in subscriber data in the subscriber data management server 300, the data update module 110 receives a request for subscriber data update, and updates the corresponding subscriber data in the database 150 in response to the request. The data update module 110 includes an update request receive unit 112 and a subscriber data update unit 114.

The update request receive unit 112 is connected to the subscriber data management server 300, and when there is a data change, the update request receive unit 112 receives an update request signal along with the changed data. When the update request receive unit 112 receives the request for data update, the subscriber data update unit 114 checks the changed data in the received request signal and updates the corresponding subscriber data in the database 150, so that the changed data is reflected on the database 150.

When there is a subscriber data change in the database 150, the subscriber data insert module 120 then transmits the changed data to a switching center in which location of a corresponding terminal is registered, and inserts the changed data into a visitor location register provided in the corresponding switching center. That is, the changed data is transmitted to a switching center where a corresponding terminal is under control, and inserted into a visitor location register provided in the switching center. The subscriber data insert module 120 includes a switching center search unit 122, a data insert unit 124, an insert result check unit 126 and a re-try unit 128.

The switching center search unit 122 searches for a switching center in which location of a terminal corresponding to the changed subscriber data in the database 150 is registered. That is, the switching center search unit 122 identifies location data of a mobile communication subscriber terminal corresponding to the changed subscriber data in the database 150, and searches for the switching center in which location of the corresponding terminal is registered.

The data insert unit 124 transmits the changed data to a switching center searched by the switching center search unit 122 to insert the transmitted data into a visitor location register provided in the corresponding switching center. At this time, a message used in requesting the switching center to insert the subscriber data may be, for example, Insert_Subscriber_Data (ISD) message.

The insert result check unit 126 checks a processing result of the data insert unit 124, i.e. whether the changed data was inserted into the corresponding switching center normally or not. At this time, the result as to whether the data was normally inserted can be seen through a response message received from the corresponding switching center. The response message received from the switching center is, for example, ISD_NACK or ISD_ACK. The ISD_NACK message is a failure message that normal processing was failed, and the ISD_ACK message is a success message that normal processing was completed.

When the insert result check unit 126 determines the failure to insert subscriber data, the re-try unit 128 enables the subscriber data inserting to be executed after location registration update of the location registration update module 130 to be described below.

If the subscriber data insert module 120 fails to insert subscriber data, the location registration update module 130 enables switching centers adjacent to the corresponding switching center to perform a location registration update. That is, in case that data of a corresponding subscriber terminal does not exist in a switching center, where its location was registered, due to an error in location registration such as double location registration, abnormal location registration and so on, the location registration update module 130 enables switching centers located near the corresponding switching center to register location of the terminal again in order to correct the error. The location registration update module 130 includes a switching center group extract unit 132, an update request unit 134 and a DB update unit 136.

When the subscriber data insert module 120 fails to insert subscriber data, the switching center group extract unit 132 extracts data of all switching centers in a group to which the failed switching center belongs, through switching center group data. The extracted switching center data is data of switching centers located near the failed switching center.

The update request unit 134 transmits a location registration update request message to all switching centers included in a corresponding group extracted through switching center group data by the switching center group extract unit 132. The message is, for example, 'CAN_LOC & UPLOC_REQ' message in the WCDMA.

The DB update unit 136 enables the corresponding switching centers to perform a location registration update at the request of the update request unit 134, and to store newly registered location data into the database 150. In this way, all switching centers adjacent to the switching center that has failed to insert subscriber data perform a location registration update, thereby correcting an error in location registration.

As the present invention enables only switching centers located near the switching center having failed to insert subscriber data to perform a location registration update through the location registration update module 130, it can reduce a system load and correct an error in location registration in a quick time. Because a boundary zone between adjacent switching centers is liable to an error in location registration caused by double location registration, abnormal location registration, etc., the error can be sufficiently corrected by location registration update of adjacent switching centers in a switching center group per location that is recorded in the database 150.

Figure 4:
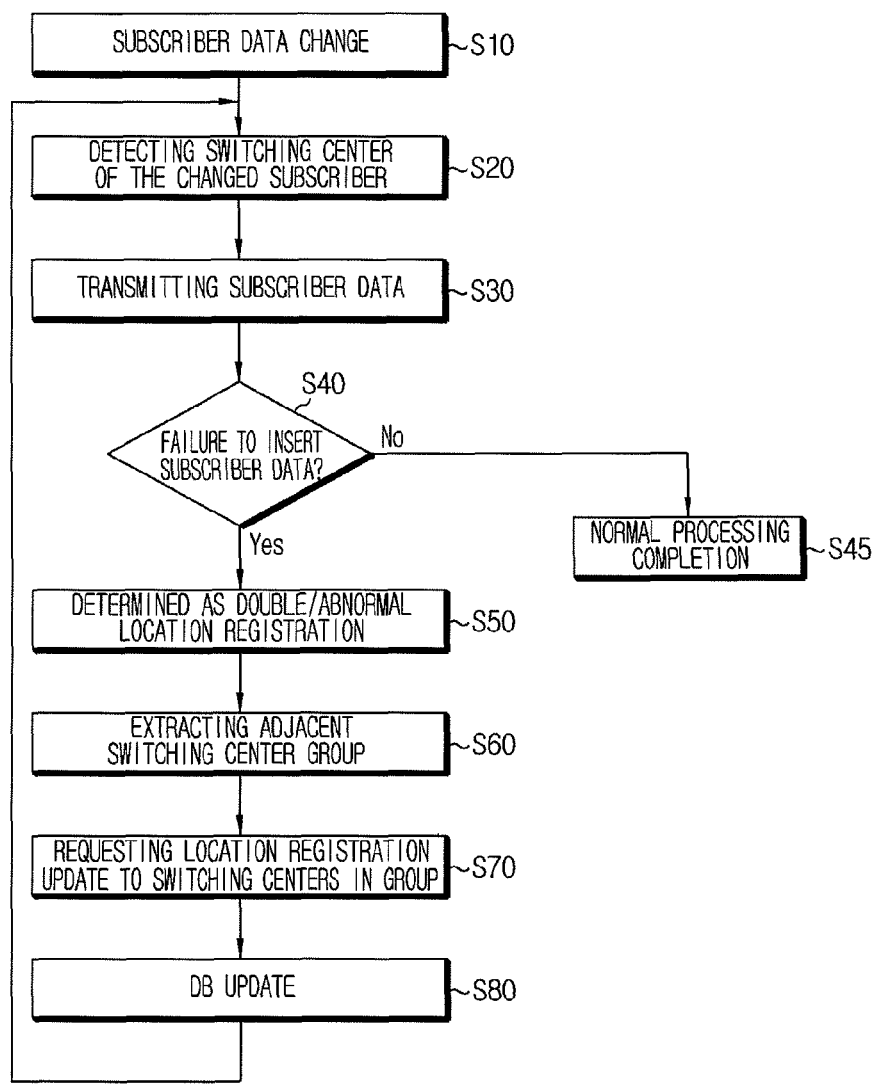
FIG. 4 is a flowchart showing the method for location registration update on failure to insert subscriber data in the mobile communication system according to an embodiment of the present invention.

FIG. 4 is a flowchart showing the method for location registration update on failure to insert subscriber data in the mobile communication system according to an embodiment of the present invention.

Referring to FIG. 4, in the case of a change in subscriber data in a subscriber data management server, corresponding subscriber data in a DB of a home location register is changed. At this time, subscriber data change is performed in response to a request for subscriber data change of the subscriber data management server. (S10)

When subscriber data in the DB of a home location register is changed, detection is made to find a switching center in which location of a corresponding subscriber's terminal is registered. This step is carried out to enable the corresponding subscriber to transmit the changed data to the detected switching center and to insert it into a visitor location register provided in the switching center. (S20)

When the subscriber's terminal finds a switching center where its location registration was made, the changed subscriber data is transmitted to the corresponding switching center. At this time, a signal requesting to insert the changed data is also transmitted together with the subscriber data. (S30)

After receiving the insert request signal, the switching center transmits a response message informing if the received subscriber data was normally inserted. Through the response message, the home location register determines if the subscriber data was normally inserted into the switching center. (S40)

When it is determined that the subscriber data was normally inserted into the switching center, the process is completed. (S45)

On the contrary, when it is determined that the subscriber data was not normally inserted, that is, it failed to insert the subscriber data, it is estimated that an error caused by double location registration or abnormal location registration occurred to the switching center and the home location register. (S50)

When it is determined there is an error in location registration, a switching center group is extracted from the DB of the home location register. At this time, the DB of the home location register stores a group indicator that is given to switching centers grouped according to geographical closeness. Thereby, a switching center group, to which the switching center having failed to insert the subscriber data belongs, is extracted. (S60)

When the switching center group is extracted, all switching centers included in the group are requested to perform a location registration update. All switching centers having a group indicator extracted from the DB of the home location register are extracted, and a signal requesting a location registration update is transmitted to the extracted switching centers. (S70)

At this time, if the error still exists even after switching centers in the corresponding switching center group performed a location registration update, a signal requesting a location registration update is transmitted to switching centers in another switching center group adjacent to the switching center group. That is, when location of the corresponding subscriber's terminal is not registered in switching centers of the corresponding switching center group, the range of switching centers needed for a location registration update is expanded to switching centers adjacent to the corresponding group.

Further, if switching centers in another switching center group adjacent to the corresponding group fail the location registration update, switching centers other than the switching centers having been requested to perform a location registration update are requested to perform a location registration update. In the end, the entire switching center may perform a location registration update to correct an error in location registration. (S70)

After the location registration update is performed in the corresponding switching center, the updated location registration data is stored in the DB of the home location register. Thereby an error caused by double location registration or abnormal location registration is corrected. (S80)

As mentioned above, after the location registration data in the DB of the home location register is updated, the step S20 begins again. That is, the changed subscriber data is transmitted to a corresponding switching center and inserted into a visitor location register provided in the switching center.

Here, as an error caused by double location registration or abnormal location registration was corrected, i.e., an error in location registration does not exist in the DB of the home location register, this retry to insert the subscriber data will be successful.

Figure 5:
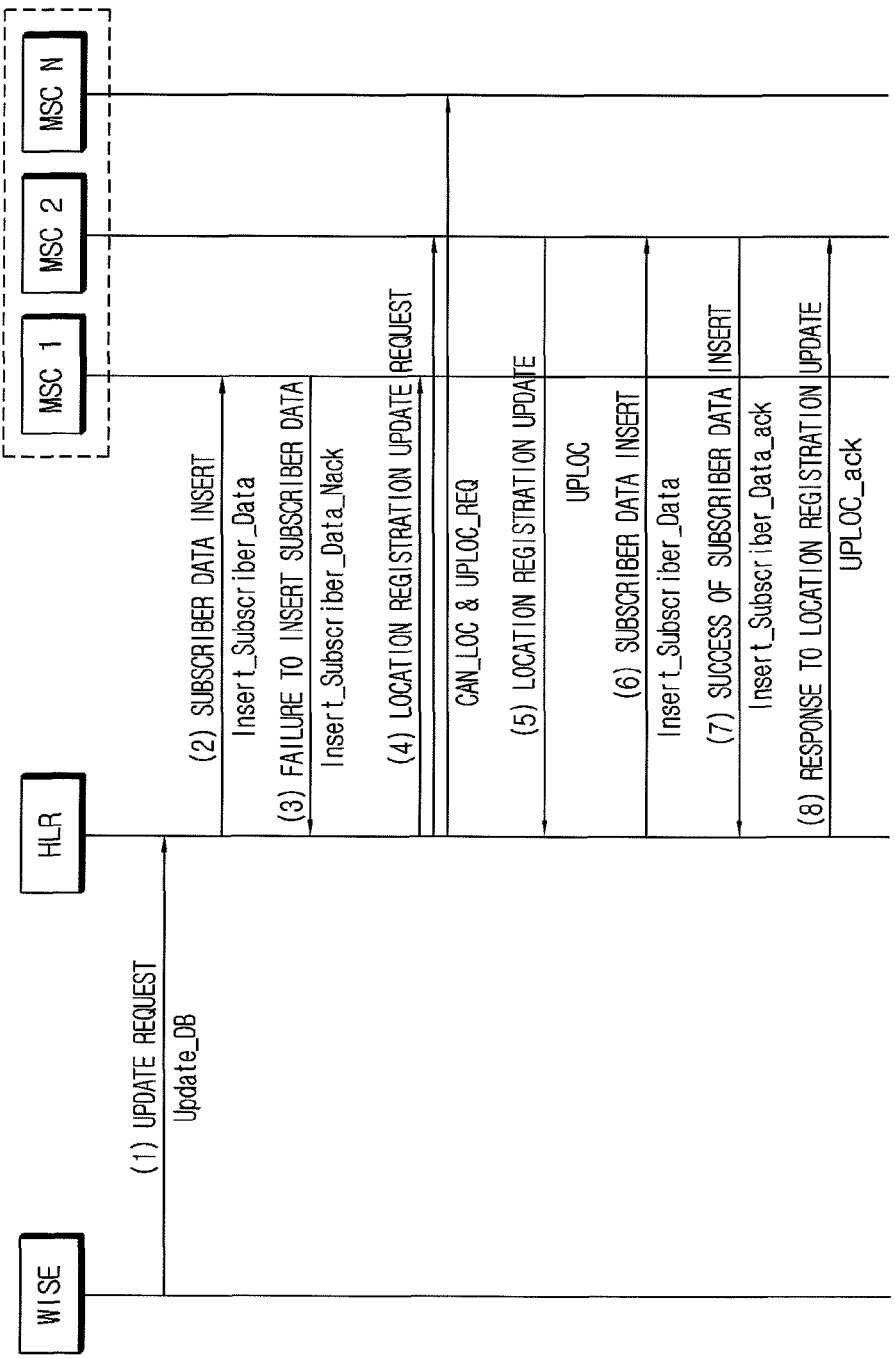
FIG. 5 is a flowchart showing, at each node, a processor for location registration update on failure to insert subscriber data in the mobile communication system according to an embodiment of the present invention.

FIG. 5 is a flowchart showing, at each node, a process for location registration update on failure to insert subscriber data in the mobile communication system according to an embodiment of the present invention.

Here, assuming that a switching center where location of a mobile communication terminal is registered in its home location register is referred to as MSCI, and a switching center where the terminal actually exists is referred to as MSC2. Due to an error in location registration such as double location registration, abnormal location registration, etc., the terminal is now under control of MSC2, but its location is registered in MSC1. MSC1, MSC2 and MSC N are included in a switching center group into which switching groups having geographical closeness are grouped.

As shown in FIG. 5, when there is a change in subscriber data due to a subscriber's request or the like, the subscriber data management server (WISE) requests the home location register (HLR) to update subscriber data to reflect the change. At this time, the request for update is made through 'update_DB' message. (1)

The home location register updates the subscriber data in response to the update request, and transmits the updated subscriber data to a switching center, where location of the corresponding subscriber's terminal is registered, so that the updated subscriber data can be inserted into the switching center. That is, the home location register transmits the updated subscriber data to MSC1 in which location of the corresponding subscriber's terminal is registered. At this time, the subscriber data transmission is made through an ISD message. (2)

Because the terminal is not actually located in a switching center where its location is registered, i.e., MSC1, it fails to insert the subscriber data into the switching center. Thus, the failure to insert subscriber data is transmitted to the home location register using a response message. At this time, the failure to insert subscriber data is transmitted using ISD_NACK message. (3)

As the subscriber data inserting is failed, the home location register requests for a location registration update to switching centers located near the switching center that has failed to insert the subscriber data. That is, the home location register extracts data of a switching center group to which MSC1 belongs from the DB, and transmits a location registration update request signal to all switching centers (MSC1, MSC2, MSC N) included in the extracted switching center group. At this time, the location registration update request signal is CAN_LOC & UPLOC_REQ signal. (4)

After the switching centers received the location registration update request, they perform a location registration update, and transmit the updated location registration data to the home location register. In this way, the location registration data in the DB of the home location register is updated. Thereby, an error caused by double location registration or abnormal location registration is corrected. (5)

After the error is corrected, the home location register transmits the changed subscriber data to a switching center where the subscriber's terminal is actually located, i.e., MSC2, so that the subscriber data is inserted into the switching center. In other words, through the error correction, location of the subscriber's terminal is registered in MSC2 where the terminal is actually located, and accordingly, the changed subscriber data is transmitted to MSC2 on this re-try. (6)

As the changed subscriber data is transmitted to MSC2 where the terminal is actually location as mentioned, the MSC2 inserts the received subscriber data into its visitor location register, and transmits a subscriber data insert success message to the home location register. At this time, the subscriber data insert success message is ISD_ACK message. (7)

And, the home location register transmits a location registration update response message to the switching center having performed a location registration update, in response to the location registration update. At this time, the location registration update response message is an UPLOC_ack message. (8)

In this way, in the case of failure to insert subscriber data due to an error caused by double location registration, abnormal location registration, etc., it enables merely adjacent switching centers, not all switching centers, to perform a location registration update, thereby reducing a system load and readily correcting an error.

The above-mentioned method according to the present invention may be incorporated as a computer readable code in a computer readable medium. The computer readable medium includes, for example, CD-ROM, RAM, ROM, a floppy disc, a hard disc, a magneto-optical disc and so on. It is well known to an ordinary person skilled in the art, and the detailed description is omitted herein.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for location registration update on failure to insert subscriber data caused by double location registration or abnormal location registration in a mobile communication system, the method comprising:
   (a) in the case of a change in subscriber data, a home location register of the mobile communication system transmitting the subscriber data to a first switching center in which location of a corresponding subscriber is registered, to request the first switching center to insert the subscriber data;
   (b) in the case of the first switching center's failure to insert the subscriber data, the home location register being notified of the failure; and
   (c) the home location register extracting a switching center group, to which the first switching center belongs, from a switching center group database (DB) for storing switching center data that is grouped according to geographical closeness, and transmitting a location registration update request signal to switching centers included in the extracted group.

2. The method for location registration update on failure to insert subscriber data in a mobile communication system according to claim 1, further comprising:
   before the step (a),
   (1) the home location register receiving a request for subscriber data update after the subscriber data change in a subscriber data management server; and
   (2) the home location register updating the corresponding subscriber data being stored and managed therein, in response to the subscriber data update request.

3. The method for location registration update on failure to insert subscriber data in a mobile communication system according to claim 1,
   wherein when the home location register registers switching center data, the switching center group DB classifies the switching centers into switching center groups according to location and stores the classified group data therein.

4. The method for location registration update on failure to insert subscriber data in a mobile communication system according to claim 3,
   wherein group identification data per location is included in the group data of the switching center group DB.

5. The method for location registration update on failure to insert subscriber data in a mobile communication system according to claim 1, further comprising:
   after the step (c),
   (3) switching centers having received the location registration update request signal performing a location registration update; and
   (4) the home location register correcting the subscriber's location registration data after the location registration update.

6. The method for location registration update on failure to insert subscriber data in a mobile communication system according to claim 5, further comprising:
   after the step (4),
   (5) transmitting the subscriber data to a second switching center in which location of the subscriber is registered based on the corrected location registration data at the step (a), to request the second switching center to insert the subscriber data.

7. The method for location registration update on failure to insert subscriber data in a mobile communication system according to claim 1, further comprising:
   after the step (c),
   (d) in case the switching centers included in the switching center group fail the location registration update, transmitting a location registration update request signal to the entire switching centers other than the switching centers having been requested to perform a location registration update.

8. The method for location registration update on failure to insert subscriber data in a mobile communication system according to claim 7, further comprising:
   before the step (d),
   (d-1) in case the switching centers in the switching center group fail the location registration update, transmitting a location registration update request signal to switching centers included in another switching center group located near the switching center group to which the first switching center belongs.

9. The method for location registration update on failure to insert subscriber data in a mobile communication system according to claim 1,
   wherein, at the step (b), the switching center's subscriber data inserting is made at a visitor location register provided in the switching center.

10. The method for location registration update on failure to insert subscriber data in a mobile communication system according to claim 1,
    wherein, at the step (a), a message requesting the switching center to insert the subscriber data is an Insert_Subscriber_Data (ISD) message.

11. The method for location registration update on failure to insert subscriber data in a mobile communication system according to claim 1,
    wherein, at the step (c), a message requesting the switching centers to update location registration is a CAN_LOC & UPLOC_REQ message.

12. An apparatus for location registration update on failure to insert subscriber data caused by double location registration or abnormal location registration in a mobile communication system, the apparatus comprising:
    a database configured to store switching center group data, subscriber data and subscriber location registration data, the switching center group data including switching center data grouped according to geographical closeness;
    a subscriber data insert means configured, in the case of subscriber data change in the database, to transmit the changed subscriber data to a switching center in which location of a corresponding subscriber is registered, to request the switching center to insert the subscriber data, and to check if the switching center inserted the subscriber data; and
    a location registration update means configured, in case it is determined that the switching center failed to insert the subscriber data, to extract a switching center group, to which the switching center belongs, from the switching center group data in the database, to transmit a location registration update request signal to switching centers included in the extracted group, and to update the subscriber location registration data in the database after the switching centers' updating of the subscriber location registration data.

13. The apparatus for location registration update on failure to insert subscriber data in a mobile communication system according to claim 12, further comprising:

a data update means configured, in the case of subscriber data change in a subscriber data management server, to receive a request for update of subscriber data corresponding to the changed data and update the subscriber data in the database.

14. The apparatus for location registration update on failure to insert subscriber data in a mobile communication system according to claim 12, wherein, in the case of the switching center's failure to insert the subscriber data, the subscriber data insert means selects a switching center after the location registration update of the location registration update means, and enables the selected switching center to insert the subscriber data.

* * * * *